United States Patent [19]

Weiss et al.

[11] Patent Number: 5,189,781
[45] Date of Patent: Mar. 2, 1993

[54] RAPID TOOL MANUFACTURING

[75] Inventors: Lee E. Weiss; Friedrich B. Prinz; E. L. Gursoz, all of Pittsburgh, Pa.

[73] Assignee: Carnegie Mellon University, Pittsburgh, Pa.

[21] Appl. No.: 821,265

[22] Filed: Jan. 10, 1992

Related U.S. Application Data

[63] Continuation of Ser. No. 562,386, Aug. 3, 1990.

[51] Int. Cl.$^5$ ............................................. B21B 13/22
[52] U.S. Cl. ................................... 29/527.2; 164/19; 427/421; 427/427; 427/455
[58] Field of Search ......................... 29/527.2; 164/19; 427/421, 422, 423, 427

[56] References Cited

U.S. PATENT DOCUMENTS

| | | | |
|---|---|---|---|
| 2,281,634 | 5/1942 | Stössel | 164/19 |
| 2,288,658 | 7/1942 | Stössel | 164/19 |
| 2,629,907 | 3/1953 | Hugger | 164/19 X |
| 3,077,647 | 2/1963 | Kugler | 164/19 |
| 3,631,745 | 1/1972 | Walkey et al. | 164/19 X |
| 3,784,152 | 1/1974 | Garner et al. | 164/19 X |
| 4,726,412 | 2/1988 | Magnan et al. | 164/19 |

OTHER PUBLICATIONS

Rapid Prototyping of tools by Weiss et al Report from Carnegie-Mellon Univ, Oct. 1989, No C-M-U-RI-TR-89-25.

Primary Examiner—Carl J. Arbes
Attorney, Agent, or Firm—Ansel M. Schwartz

[57] ABSTRACT

A method for rapid tool manufacturing comprising the steps of first building an SFF pattern made of plastic to be used to make a first die half. Then there is the step of spraying metal onto the pattern to form a first metal substrate. Next, there is the step of separating the substrate from the SFF pattern to form the first die half. Then there is the step of building a second SFF pattern to be used to make a second die half. Next, there is the step of spraying metal onto the second SFF pattern to form a second metal substrate. Then there is the step of separating the second metal substrate from the second SFF pattern to form the second die half. In a preferred embodiment, the method for rapid tool manufacturing the second die half is formed by first the step of building an SFF model of a part to be molded. Then, there is the step of inserting the model into the first die half. Next, there is the step of spraying metal onto the model in the first die half to form a second metal substrate. Then there is the step of separating the second metal substrate from the model and the first die half to form the second die half.

27 Claims, 7 Drawing Sheets

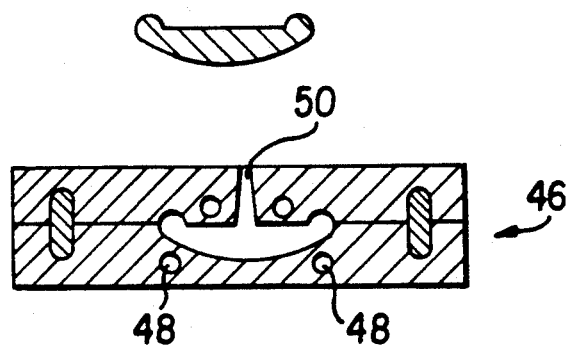
FIG. 3
PRIOR ART
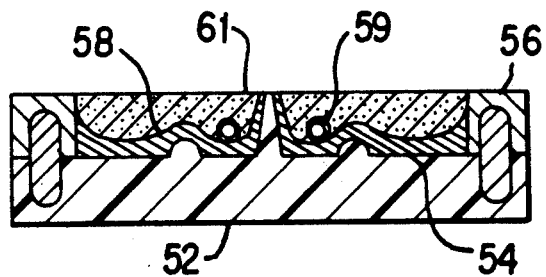
FIG. 4
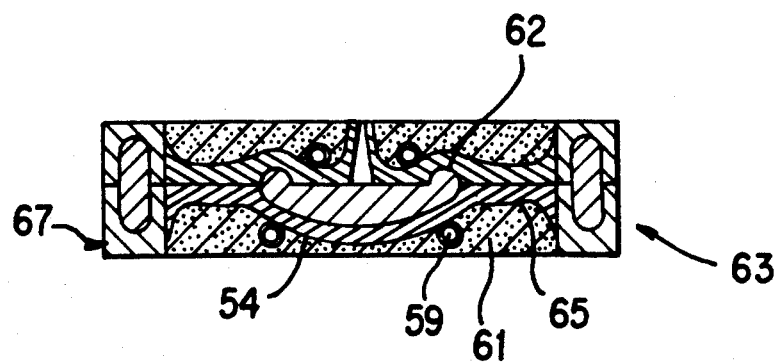

RAPID TOOL MANUFACTURING

This invention was made with Government support under Contract NOOO14-88-K-0642 awarded by the Department of the Navy. The Government has certain rights in this invention.

This is a continuation of copending application Ser. No. 07/562,386 filed on Aug. 3, 1990.

FIELD OF THE INVENTION

The present invention is related to rapid tool manufacturing. More specifically, the present invention is related to rapid tool manufacturing using solid freeform fabrication, such as stereolithography, and thermal spray deposition.

BACKGROUND OF THE INVENTION

The capability to manufacture a wide variety of quality products in a timely and cost-effective response to market requirements is a key to global competitiveness. The opportunities for improving manufacturing technology range across the entire spectrum of industries, materials, and manufacturing techniques. There is no single technological innovation which, by itself, will significantly improve productivity; rather it is a systems issue which involves rethinking many manufacturing activities. One such activity is the manufacture of tooling (i.e., design, prototype, and fabrication) such as dies required for the high-volume production methods that generate most of our manufactured products. Tooling manufacture is typically an expensive and time-consuming process. The reasons lie not only in the fabrication costs and time constraints imposed by conventional machining methods, but also in the organizational framework. In most organizations, different groups employ different processes to design and manufacture tools and products, and the expertise in tool design and product design reside in different groups, impeding communications between them. The representational and physical models used in design, prototyping, and manufacturing are often incompatible with one another, so that transitions between the stages are time-consuming and error-prone. Products often make several complete cycles through design, prototyping, and fabrication before reaching production. Thus, new product development or product modification implies a series of iterative changes for both product manufacturers and toolmakers. For all these reasons, a rapid and smooth transition from product concept to production remains a challenge.

The present invention describes the development of a unified CAD/CAM tool manufacturing system. In this system, both prototyping and tooling fabrication are based upon compatible solid freeform fabrication, while the underlying geometric and process models share a common representational scheme.

Solid freeform fabrication (SFF) builds three-dimensional shapes by incremental material buildup of thin layers, and can make geometrically complex parts with little difficulty. These processes include selective laser sintering (Deckard, C. R. (1987). Recent Advance in selective laser sintering, in *Fourteenth conference on production research and technology*, NSF, Ann Arbor, Mich. October), laminated object manufacturing (Colley, D. P. (1988). Instant Prototypes, *Mechanical Engineering*, July), ballistic powder metallurgy (Hauber, D. (1987). Automated fabrication of net shape microcrystalline and composite metal structures without dies, in *Manufacturing processes, systems and machines: 14th conference on production research and technology*, S. K. Samanta, Ed., NSF, Ann Arbor, Mich., October), three-dimensional printing (Sachs, E. (1989). Three dimensional printing: rapid tooling and prototypes directly from a CAD model, in *Advances in manufacturing systems engineering*, ASME, Winter Annual Meeting, 1989), stereolithography, and near-net thermal spraying. The present invention incorporates commercially available technologies: stereolithography apparatus (SLA) and arc spray equipment. Stereolithography, which has been commercialized by 3D Systems, Inc. (Valencia, Calif.), is a new process which creates plastic prototype models directly from a vat of liquid photocurable polymer by selectively solidifying it with a scanning laser beam. In arc spraying, metal wire is melted in an electric arc, atomized, and sprayed onto a substrate surface. On contact, the sprayed material solidifies and forms a surface coating. Spray coatings can be built up by depositing multiple fused layers which, when separated from the substrate, form a free-standing shell with the shape of the substrate surface. By mounting the shell in a frame and backing it up with appropriate materials, a broad range of tooling can be fabricated including injection molds, forming dies, and EDM electrodes. For example, the cavities of injection molds can be fabricated by direct deposition of metal onto plastic SLA models of the desired part and backing the framed shell with epoxy resins. Relative to conventional machining methods, the sprayed metal tooling approach has the potential to more quickly and less expensively produce tools, particularly for those parts with complex shapes or large dimensions,. Thus, with stereolithography, an initial part shape or prototype is quickly created. Thermal spraying is then used to make tools based on the part shapes produced by stereolithography.

The potential effect of combining thermal spraying with stereolithography to build tooling is enhanced by integrating and automating these processes within a unified CAD/CAM environment. The goal of integration is to reduce the number of interactive cycles through design, prototyping, and fabrication. CAD-based evaluation and modification tools can operate on design models to help the designer create manufacturable designs on the basis of requirements and limitations of the downstream processes. For example, there are certain shape features in thermally sprayed parts which are difficult to spray. The system should identify these features so that the designer may modify them before reaching the fabrication stage. Another example is to automatically critique ejectability by analyzing whether there is sufficient draft for part ejection from an injection mold or mold die. If drafts are not sufficient, the system should identify this geometric problem and bring it to the designer's attention.

Another step in the CAD/CAM approach is to automate the thermal spray process with robotics. Tooling manufacture by thermal spraying is currently a labor-intensive artform. Shifting emphasis to robotic spraying, driven by an off-line trajectory and process planner, will improve tooling quality by achieving consistent and predictable performance of the sprayed metal shell.

Finally, the level of integration and the number of different models, in this CAD/CAM system requires geometric representations that can be abstracted at several levels and that can be manipulated over several dimensions. Rather than use several different modeling environments customized for the demands of each subsystem, the models in our framework for design, analysis, and fabrication share a single common unifying geometric representation implemented in the software modeling system NOODLES ("Vertex-based representation of non-manifold boundaries" by E. Levent Gursoz, Young Choi, Frederick D. Prinz; IFIP WG 5.2/NSF working conference on geometric modeling RPI, Sept. 1988, pp. 107-130). With this approach, model manipulation capability is robust and models need not be transformed between subsystems.

The present invention represents a significant departure in tool manufacturing compared with conventional methodologies. The majority of ongoing research (Hayes, C. and Wright, P. (1989) Automating process planning: using feature interactions to guide search, *Journal of Manufacturing Systems*, 8(1); Cutkosky, M. R. and Tenenbaum, J. M. *CAD/CAM integration through concurrent product and process design, in Proceedings of the symposium on intelligent and integrated manufacturing*, ASME, December), 1987 focuses on automating numerical control (NC) fabrication by removing material from metal blanks. Manufacturing a broad class of complex geometries is difficult without extensive programmer and operator intervention, so that NC fabrication remains expensive and relatively time-consuming. In addition, the fabrication of prototype parts has remained disjoint from the processes to fabricate the production part. In contrast, geometric complexity is not an issue with SLA, so that complex metal shapes can be fabricated by direct metal deposition onto the SLA models. Also, tooling fabrication builds directly upon the prototyping process. Such process compatibility and system integration will facilitate a continuous transition from design to prototyping to mass production within a single manufacturing enterprise.

SUMMARY OF THE INVENTION

The present invention pertains to a method for rapid tool manufacturing. The method comprises the steps of first building an SFF pattern made of plastic to be used to make a first die half. Then there is the step of spraying metal onto the pattern without any solid layer between the pattern and the metal to form a first metal substrate. Next, there is the step of separating the substrate from the SFF pattern to form the first die half. Then there is the step of building a second SFF pattern to be used to make a second die half. Next, there is the step of spraying metal onto the second SFF pattern to form a second metal substrate. Then there is the step of separating the second metal substrate from the second SFF pattern to form the second die half.

In a preferred embodiment, the method for rapid tool manufacturing of the second die half is formed by first the step of building an SFF model of a part to be molded. Then, there is the step of inserting the model into the first die half. Next, there is the step of spraying metal onto the model in the first die half to form a second metal substrate. Then there is the step of separating the second metal substrate from the model and the first die half to form the second die half.

In a more preferred embodiment, after the step of spraying metal onto the pattern, there are the steps of applying a water-soluble release agent on the pattern and the step of pouring backing material onto the first metal substrate to support it. The step of separating the substrate from the pattern then preferably includes the step of dissolving the water-soluble release agent. It is also preferably before the pouring step, the step of laying in place on the first metal substrate tubing for cooling channels.

In an even more preferred embodiment, after the step of building the SFF pattern, there is the step of placing a metal frame onto the pattern. The step of spraying metal on the pattern then includes the step of spraying metal around the inside edge of the metal frame. Furthermore, after the inserting step, there is the step of applying a water-soluble release agent on the model, and placing a second metal frame on the first die half. After the step of spraying metal onto the model and around the inside edge of the frame, there are preferably the steps of laying in place on the model tubing for cooling channels; the step of pouring backing material on the model to support the second metal substrate and the step of dissolving the water-soluble release agent between the second metal substrate and the model. In general, there are applications utilizing both single dies and complementary die sets.

The invention is also a method for rapid tool manufacturing which is characterized by the steps of building an SFF pattern from a computer-based geometrical model followed by robotically spraying metal onto the SFF pattern in correspondence with the computer based geometric model. Preferably, before the building step, there is the step of creating the computer-based geometric model on a CAD/CAM system.

BRIEF DESCRIPTION OF THE DRAWINGS

In the accompanying drawings, the preferred embodiments of the invention and preferred methods of practicing the invention are illustrated in which:

FIG. 3 is a schematic representation of a conventional mold or injection mold die set.

FIG. 4 is a schematic representation of a rapid tool manufacturing process of the present invention.

FIG. 11 is a schematic representation of locating skin fills and interiors with NOODLES.

FIG. 12 is a schematic representation of vector generation of NOODLES.

DESCRIPTION OF THE PREFERRED EMBODIMENT

Figure 1:
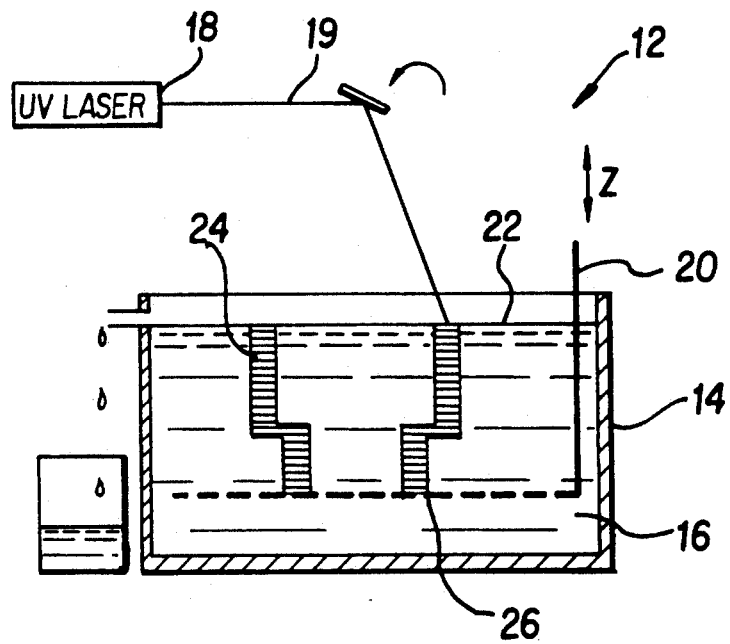
FIG. 1 is a schematic representation of a stereolithography apparatus.

Referring now to the drawings wherein like reference numerals refer to similar or identical parts throughout the several views and more specifically to FIG. 4 thereof there is shown a method for rapid tool manufacturing. The method comprises the steps of first building an SFF pattern made of plastic such as an SLA pattern 52 to be used to make a first die half 60. Then there is the step of spraying metal onto the pattern 52 without any solid layer between the pattern and the metal to form a first metal substrate 58. Next, there is the step of separating the substrate 58 from the SFF pattern 52 to form the first die half 60. If a single die is being manufactured, such as an EDM electrode or a superplastic forming die, then the die is essentially complete at this point.

In a first embodiment, there is then the step of building a second SFF pattern to be used to make a second die half. Next, there is the step of spraying metal onto the second SFF pattern to form a second metal substrate 58. Then there is the step of separating the second metal substrate 58 from the second SFF pattern 52 to form the second die half.

In a preferred embodiment, the method for rapid tool manufacturing the formation of the second die half 63 is formed by first the step of building an SFF model 62 of a part to be molded. Then, there is the step of inserting the model 62 into the first die half 60. Next, there is the step of spraying metal onto the model in the first die half 60 to form a second metal substrate 65. Then there is the step of separating the second metal substrate 65 from the model 62 and the first die half 60 to form the second die half 63.

Preferably after the step of spraying metal onto the pattern 52, there are the steps of applying a water-soluble release agent 54 on the pattern 52 and the step of pouring backing material 61 onto the first metal substrate 58 to support it. The step of separating the substrate 58 from the pattern 52 then preferably includes the step of dissolving the water-soluble release agent 54. It is also preferable before the pouring step, the step of laying in place on the first metal substrate 58 tubing 59 for cooling channels.

After the step of building the SFF pattern 52, there is preferably the step of placing a metal frame 56 onto the pattern 52. The step of spraying metal on the pattern 52 then includes the step of spraying metal around the inside edge of the metal frame 56. Furthermore, after the inserting step, there is the step of applying a water-soluble release agent 54 on the model 62, and placing a second metal frame 67 on the first die half 60. After the step of spraying metal onto the model 62 and around the inside edge of the frame 67, there are preferably the steps of laying in place on the model 62 tubing 59 for cooling channels; the step of pouring backing material 61 on the model 62 to support the second metal substrate 65 and the step of dissolving the water-soluble release agent 54 between the second metal substrate 65 and the model 62.

The invention is also a method for rapid tool manufacturing which is characterized by the steps of building an SFF pattern from a computer-based geometrical model followed by robotically spraying metal onto the SFF pattern in correspondence with the computer based geometric model. Preferably, before the building step, there is the step of creating the computer-based geometric model on a CAD/CAN system.

In the operation of the preferred embodiment, stereolithography is a process which quickly makes plastic prototypes of arbitrary geometric complexity directly from the computer models of the parts. The stereolithography SLA does not require experienced model makers, and the machine runs unattended once the building operation is started. It is relatively straightforward for the designer to program and run the SLA.

SLA is the product of 3D Systems, Inc. of Valencia, Calif. Their system for SLA 12 (FIG. 1) is composed of a vat 14 of photosensitive liquid polymer 16, an x-y scanning ultraviolet laser 18 beam 19 with a 0.25 mm (0.01 in.) beam diameter, and a z-axis elevator 20 in the vat 14. The laser 18 beam 19 is focused on the liquid's surface 22 and cures the polymer, making solid forms 24 wherever the beam 19 has scanned. The depth of cure is dosage-dependent. The physical object to be created, as described by a boundary representation model (in the 3D Systems device, this is a triangulated, planar surface PHIGS B-Rep.), is first "sliced" into thin cross-sectional layers along the z-axis. For each slice, the laser's 18 trajectory is dictated by the cross sections boundary and by the bounded region.

The elevator platform 26 is initially positioned at the surface 22 of the liquid 16. As the laser 18 draws a cross section in the x-y plane, a solid layer is formed on the elevator platform 26. The platform 26 is lowered and then the next layer is drawn in the same way and adheres to the previous layer. The layers are typically between 0.13 and 0.5 mm (0.005 and 0.020 in.) thick. A three-dimensional plastic object 24 thus grows in the vat 14, starting at the object's bottom and building to the top.

To save time, the SLA laser 18 does not fully cure each cross section. Rather, the laser 18 cures the boundary of a section, and then cures an internal structure, or honeycomb, that traps the uncured fluid 16. Top and bottom surfaces, on the other hand, are fully cured. These surfaces are cured by commanding the laser 18 to draw the whole surface with overlapping lines; the result of this operation is called skin-fill. Final curing under separate ultraviolet lights solidifies the complete part. The current accuracy of SLA objects 24 is of the order of 0.25 mm (0.010 in.), while surface texture is dependent on the building orientation. Additional post-processing, such as carefully sanding and grinding the part, is therefore required for making accurate and smooth models.

There is an engineering cost to preparing a part design for SLA construction. Support structures are added to the part to hold it together while it is being built, the part must be oriented in the vat 14 for best surface quality and fastest build time, and SLA process parameters must be planned. One example of the latter is the choice of layer thicknesses in the part; they do not have to be constant throughout the part, and their choice has a first-order effect on the accuracy, the surface quality, and the build time of the part.

Tooling can be fabricated with arc spraying upon appropriate substrate patterns. Examples which demonstrate this process for fabricating injection dies using SLA patterns are described below and compared with conventional pattern-making techniques. The combination of stereolithography with thermal spraying provides a tooling fabrication process which builds directly upon prototype models. These models are rapidly produced and the ability to modify them for spraying applications is straightforward.

Figure 2:
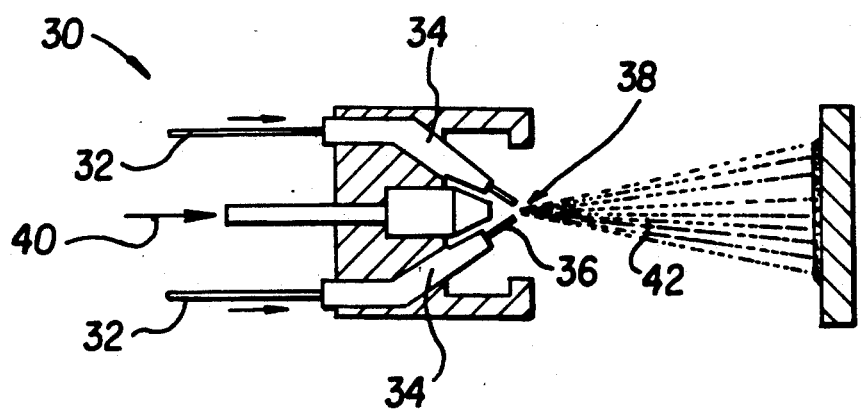
FIG. 2 is a schematic representation of electric arc spraying.

The concept of sprayed metal tooling 30 has been in existence for decades (Garner, P. J., New die making technique, *SPE Journal*, 27(5), May 1971). Current commercial technology uses electric arc spraying. The arc spray process (FIG. 2) uses two spools of metal wire 32 which are fed to a spray gun 34 where the wire tips 36 form consumable electrodes. A high current is passed through the electrodes creating an arc 38 which melts the wire tips 36. The molten particles 42 are atomized by a high pressure air jet 40 directed at the arc and are accelerated in the air stream. These particles strike the surface of a substrate 44 where they flatten out and quickly solidify.

A conventional machined injection mold die set 46 is shown in cross section in FIG. 3. The holes 48 represent cooling/heating channels, and the injection geometry is that of a simple sprue gate 50. Alternatively, the fabrication steps for building a sprayed mold using SLA patterns are depicted in FIG. 4.

The steps are:

STEP 1

Build SLA pattern 52 used to make one die half. This pattern is the complement of the interior of this die half. In this example, the die pattern 52 includes the partial part shape, a parting plane, and sprue gate.

STEP 2

Apply a water-soluble release agent 54 onto the plastic pattern 52, such as polyvinyl alcohol (PVA), to facilitate separation of metal from plastic.

STEP 3

Place a metal frame 56 onto the pattern 52.

STEP 4

Spray metal onto the pattern and around inside edge of frame. Alloyed zinc compositions are typically used for this particular process because their relatively low residual stress permits thick shells to be deposited. Sprayed shell thicknesses are typically on the order of 2-7 mm. Fine pattern details are accurately replicated by this spray process.

STEP 5

Lay in place copper tubing 60 for cooling channels for the injection molding process. Additional injection mold components, such as prefabricated ejector pin assemblies (not shown), can be added in STEP 1 and sprayed in place in STEP 4.

STEP 6

Pour in a backing material 61 to support the metal substrate 58. Typical backing materials include epoxy mixed with aluminum shot.

STEP 7

Separate the substrate pattern 58 from the die half. This is aided by dissolving the PVA in water. This completes the fabrication of the first die half 60.

STEP 8

With SLA, build a model 62 of the whole part to be molded, including runners and gates, and insert the model 62 into the first die half 60. This forms the pattern for spraying the second die half.

STEP 9

The second die half is completed by repeating STEPS 2-7.

The die set fabrication is completed by removing the SLA insert.

Figure 5:
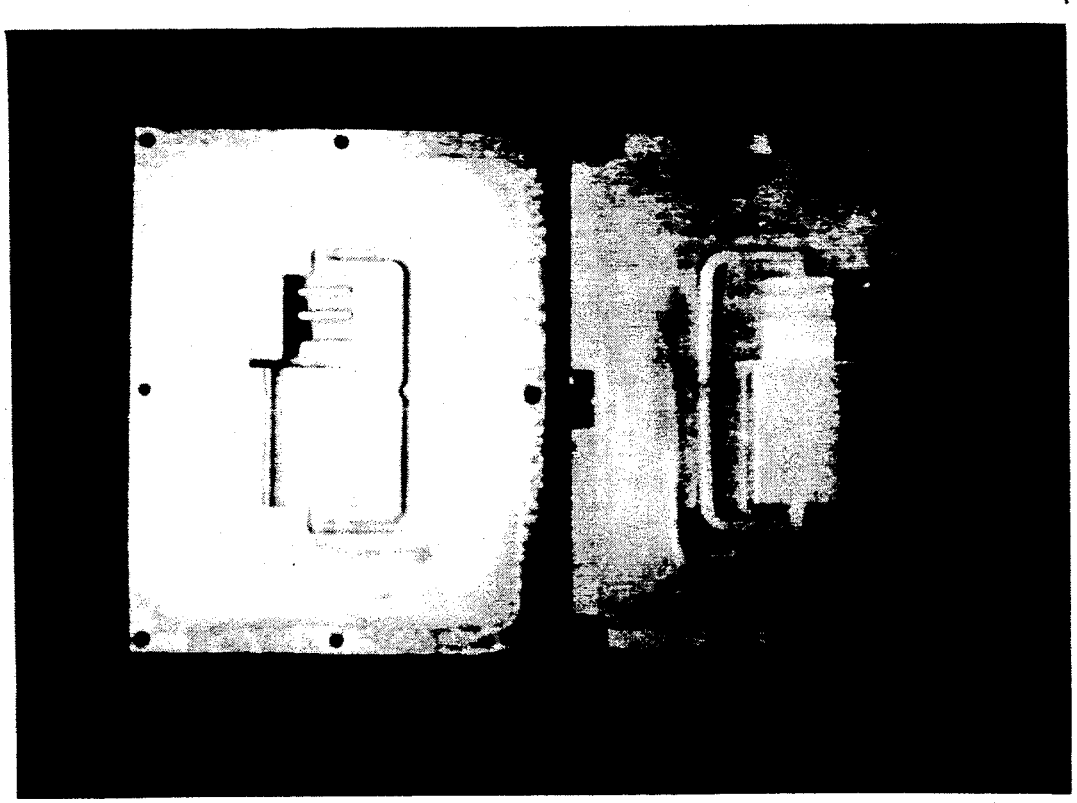
FIG. 5 is a picture of a turbine blade mold manufactured by the process of the present invention.
Figure 6A:
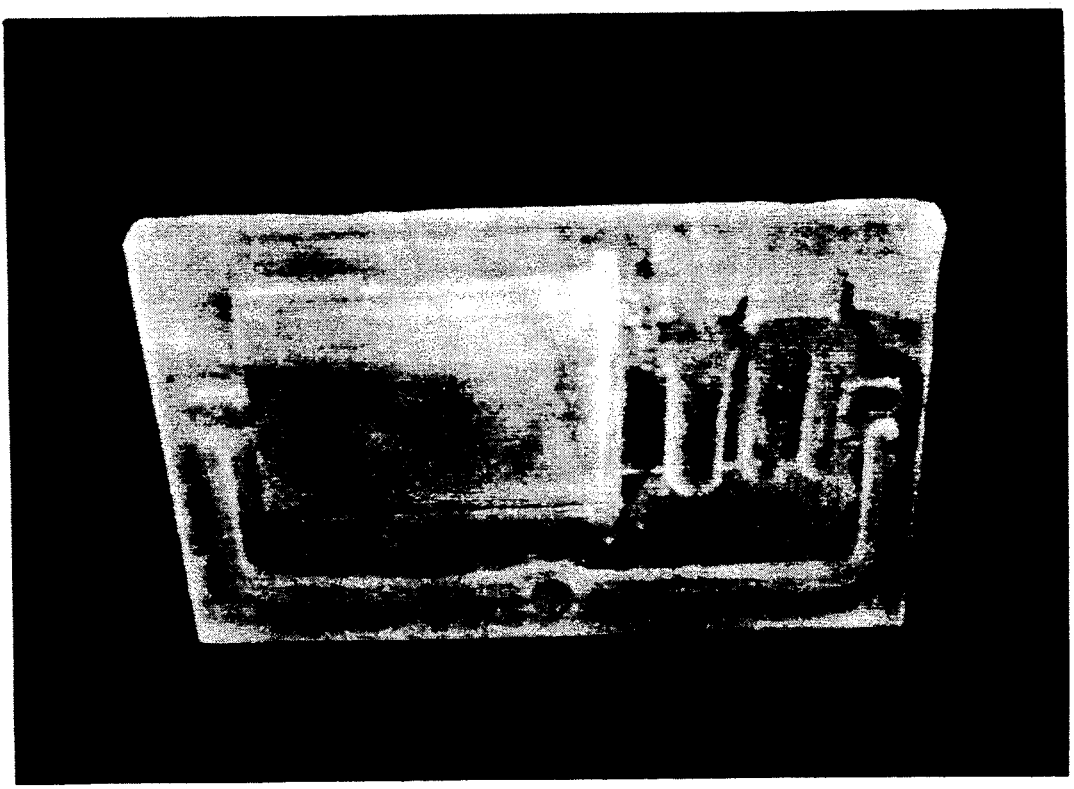
FIGS. 6A and 6B are pictures of a pattern for a first die half and inserts for a second die half for the turbine blade die shown in FIG. 5.
Figure 6B:
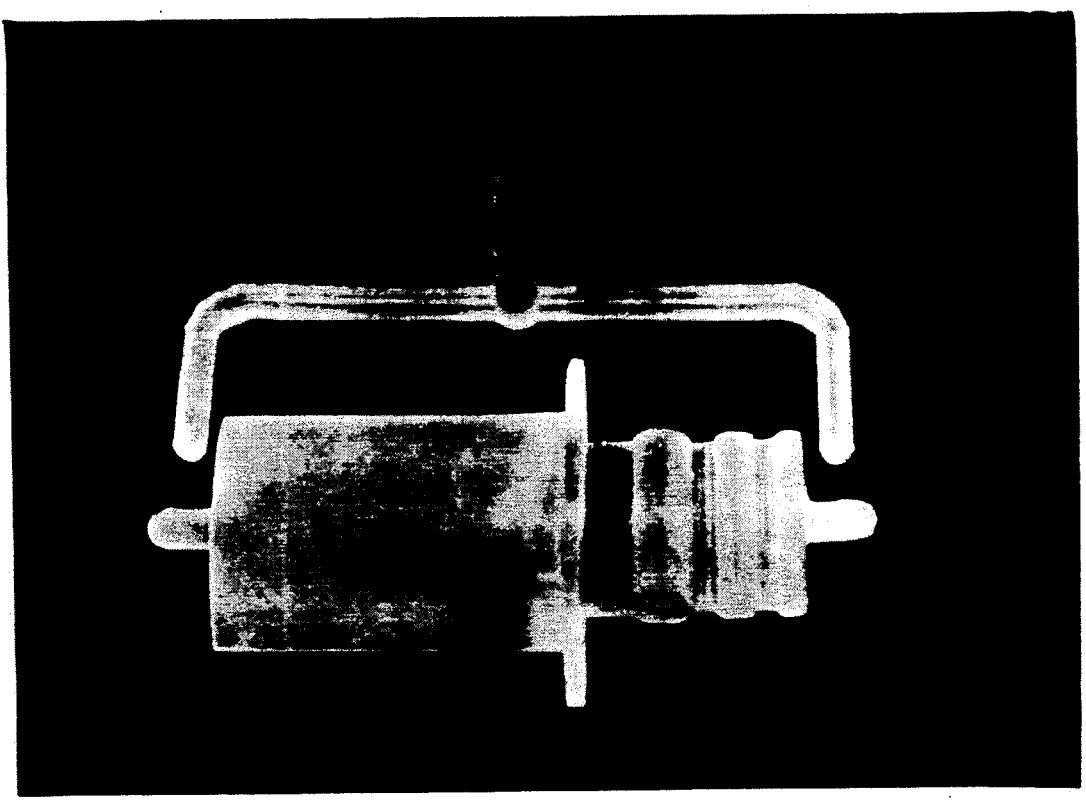
Figure 7:
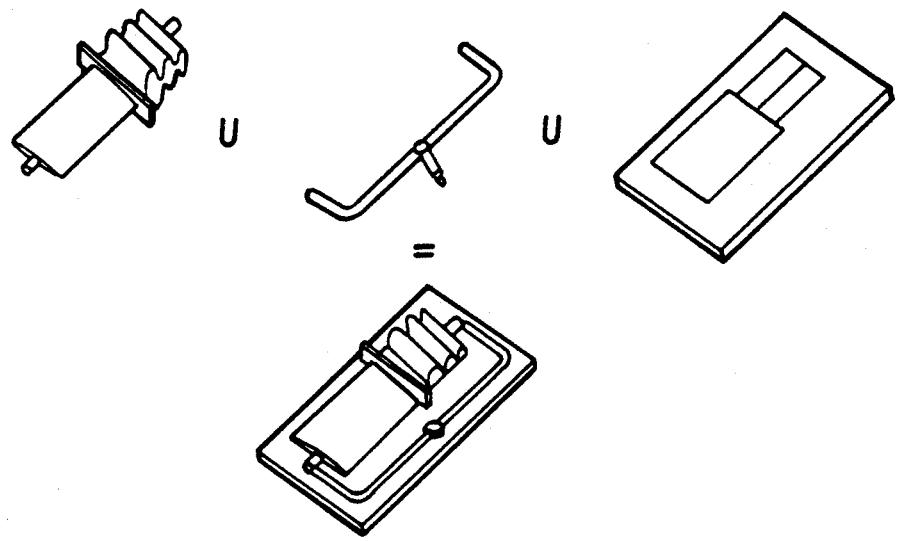
FIG. 7 is a schematic representation of how the turbine blade die pattern is formed.

Using these steps, there has been fabricated, for instance, the injection mold in FIG. 5 for making a polyethylene turbine blade. This example is interesting because of this shape's complexity and useful since molded plastic blades can be used for making castings for metal blades. This tool also includes a nonplanar parting surface and a complex runner system. The fabrication of this tool requires three SLA patterns, shown in FIG. 6 which can be built simultaneously in the vat. The first pattern in FIG. 6 is sprayed to make the first half of the mold. In contrast to the planar parting surface in the first example, the blade mold requires a nonplanar parting surface to permit ejection of the molded blade from the tool. To create this pattern, the computer models of the blade and runner are embedded into the parting plane model in FIG. 7 using simple union operators. Another major advantage of using SLA to create spray patterns is demonstrated by this nonplanar parting plane example. Conventionally, the first die half can be prepared by partially embedding a complete prototype model of the part into, say, melted paraffin. The paraffin then cools to form a planar parting surface around the remaining partial part shape. With this approach it is difficult to sculpt nonplanar surfaces. Other approaches which build up parting planes with sheet-wax, clay, or plaster are tedious and difficult. Machining complex patterns is time-consuming and expensive. With SLA it is straightforward and relatively quick to build complex patterns, with nonplanar parting surfaces, and include the runner system in these models.

Once the first half of the mold is completed, the initial pattern is removed and SLA models of the blade with tab gates and the runner with the injection sprue gate are inserted into the die cavities. The process is then repeated to build the second die half.

The need to execute accurately spray paths based on process knowledge and to repeat consistently operations makes a robotic system preferable in the rapid tool manufacturing domain. Arc spraying robots currently provide repeatability in surface coating applications (Metco Inc., Six axis robot developed for thermal spray coating, *Robotics World,* February, 1985; Tafa Inc., Arc spray robot can coat at twice manual speed, *Robotics World,* March, 1985). However, the spray paths are manually generated with a teach pendant for all but the simplest of part geometries. Automated and intelligent decision making capabilities, using design models and process knowledge for off-line path generation, are absent from these systems.

Automated thermal spraying requires the scheduling of the arc spray parameters and the selection of the robot path. These parameters include: arc voltage, wire feed rate, atomizing gas pressure, atomizing gas type, wire diameter, and nozzle geometry. Many of these parameters are directly affected by the type of material being sprayed. Because the number of parameters is high, an experimental testbed is crucial to study systematically how these parameters affect shell quality. Some insight into this problem may be gained from published statistical methods for tuning the thermal spray process parameters to produce optimal thin surface coatings (Van Doren, S. L., A statistical method of plasma spray parameter testing in *Proceedings of the second national conference on thermal spray,* ASM, Long Beach, Calif., October, 1984).

Although arc parameters directly affect the sprayed shell quality (Thorpe, M. L., How recent advances in arc spray technology have broadened the ranges of applications, in *Thermal spray technology: new ideas and processes,* ASM International, October, 1988), the path of the gun is of equal importance. Robot paths must be found that traverse the substrate to deposit a uniform layer even when the substrate presents geometric features that make spraying difficult.

Figure 8:
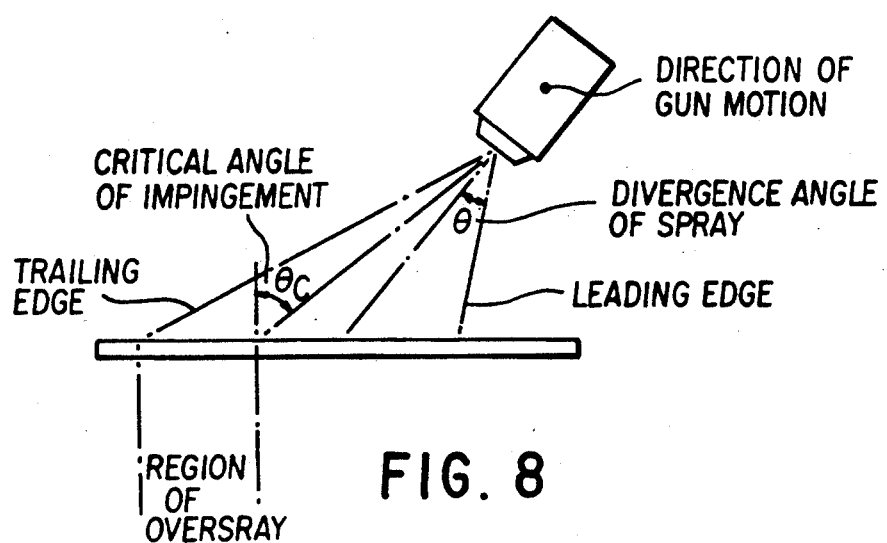
FIG. 8 is a schematic representation of spray metal from a single gun.

For example, consider overspray as shown in FIG. 8. Particle trajectories should align with the surface normals to assure maximal splattering of the molten particles. As the angle of impingement increases, that is, as the angle between the particle trajectory and the surface normal increase, the shell quality degrades. After some critical impingement angle $\theta_c$, the particles bounce off the surface 70 as wasted overspray or become entrapped in the shell reducing its strength or shadow effects are accentuated. Although $\theta_c$ is a function of the spray parameters, $\theta_c = 45°$ has been used as a rule-of-thumb (Franklin, J., Designing for thermal spraying, *Engineering*, July/August, 1986). The amount of overspray generated is therefore dependent upon the gun orientation relative to the part surface. The following examples illustrate how this information can be accounted for in planning.

Figures 9A, 9B:
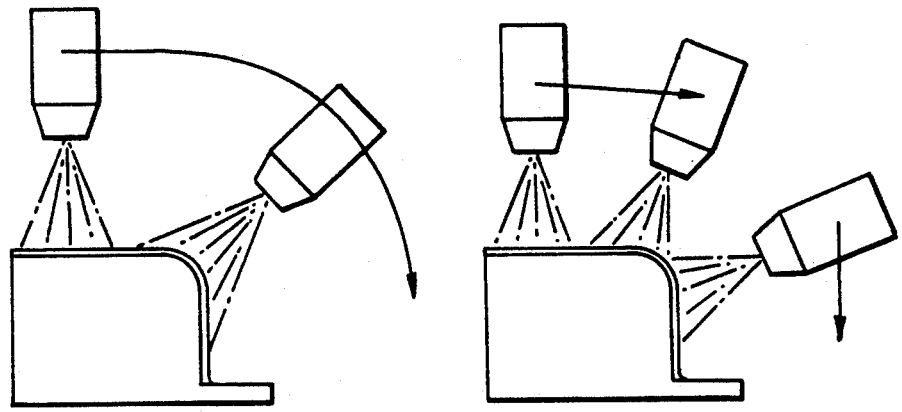
FIGS. 9A and 9B are schematic representations of alternate spray paths for spray metal.

For a simple planning algorithm, the spray path is defined by a grid on the surface of the substrate. In this algorithm, the spray gun is oriented normal to the surface and follows each line of the grid with a constant standoff distance. This strategy is referred to as the surface-normal tracking strategy. To analyze the overspray performance of this strategy, consider the convex corner of the cross section shown in FIG. 9 (A). $\theta$ is defined as the spray divergence angle. There is no overspray so long as all of the spray hits a flat surface, the gun axis is perpendicular to the flat surface, and $\theta \leq \theta_c$. However, this strategy produces overspray on both the vertical and horizontal surfaces as the gun negotiates the corner.

An alternative two-step strategy (FIG. 9B) eliminates overspray for this example. As the gun approaches the corner, it is oriented so that the trailing edge of the spray cone makes an incident angle of $\theta_c$. As the leading edge starts traversing the curved surface, its incident angle increases and spraying is stopped when it becomes $\theta_c$. At this time both the leading and the trailing edges make incident angles of $\theta_c$ so that there is no overspray on any surface. The gun is then reoriented so that the leading edge makes an incident angle of $\theta_c$ with the vertical surface, and repositioned so that the trailing edge makes an incident angle of $\theta_c$ with the curved surface. Spraying is restarted from this position and proceeds down the vertical surface.

These two strategies demonstrate spray planning for a simplified two-dimensional case. In practice, strategies will have to be synthesized which account for the interaction of the spray cone with three-dimensional and more complex shapes, and which address a range of spray performance requirements. However, these examples demonstrate one important result. The first strategy only considers geometry, while the second strategy also considers process limitations; the framework of considering both geometry and process resulted in a superior strategy.

Robot paths must be found to traverse the workpiece given these process limitations. The basis of one approach to this problem is a planner based on geometry features, such as the corner feature of the example. A feature-based strategy uses extracted features to recognize spray problem areas, and then uses successful strategies, predetermined for each feature, to generate a robot path plan. The capability to define and extract three-dimensional features is being developed within the NOODLES environment. (NOODLES is a data structure which implements a non-manifold geometric representation. The ability to model non-homogeneous entities, i.e. different dimensions and to perform non-regular operations on them, i.e. boolean operations between different dimensions facilitates geometric reasoning and geometrics manipulation geometrics. Shape feature description and recognition using an augmented topology graph grammar, in *Engineering design research conference*, NSF, Amherst, Mass., June 1989).

The discovery of a good path for the spray torch is critical to successful robotic spraying. Equally critical is the translation of the torch's path into a complete, reachable, and smooth robot trajectory. It is simple to create trajectories that are unreachable by the robot. A second difficulty coming from off-line generated paths is the problem of creating paths that result in smooth robot motion. The tool manufacturing system will build upon robot motion. The tool manufacturing system will build upon robot path optimization research at Carnegie Mellon (Hemmerle, J. S. (1989). Optimal path placement for kinematically redundant manipulators, PhD dissertation, Carnegie Mellon University).

The representational requirements for modeling systems, including the levels of abstraction, the nature of the analyses, and the geometric manipulations, vary with the context of the model's use. In CAD/CAM applications, the models for design, analysis, and evaluation, and fabrication are quite different for each subsystem. In typical systems numerous modeling environments are incorporated to satisfy the requirements of each subsystem. An approach which incorporates several different modeling environments has several drawbacks. First, it is error-prone and inefficient since models must be transformed between each separate environment. Second, nonuniform data structures make the software difficult to manage.

Finally, it is not easily extendible to new system applications which may require a mixture of the attributes of different environments. The key to successful integration is to provide a modeling environment in which design models, description of prototype models, and manufacturing methods are uniformly treated. To address this issue, manufacturing system is built upon a geometric modeling environment, NOODLES (Gursoz, E. L., Choi, Y. and Prinz, F. B., Vertex-based representation of non-manifold boundaries, in *Second workshop on geometric modelling*, M. J. Wozny, J. Turner and K. Preiss, Ed., IFIP, New York, September, 1988), where subsystem models share a common representational and manipulation scheme.

The following examples demonstrate some of the diverse modeling requirements for this CAD-based manufacturing system:

The user designing a part should be allowed to select the appropriate modeling description paradigm depending upon the immediate need. For example, designs, at times, can best be synthesized using constructive solid geometry, or building solids up from sets of surfaces, while, at others, sweeping lower-dimensional elements, such as curves and surfaces, into solid representations produce more satisfactory results.

The SLA process planner must convert solid models into an ordered set of 2½ D cross sections (i.e., cross sections with an associated depth or thickness) and span these ross sections with appropriate drawing vectors. This operation dimensions since one generates planes from solid models, and then vectors, or line segments, from the planes.

The robotic spray planner operates with yet other abstractions. Grids are projected onto the object's shell to produce surface patches which are analyzed for spraying action. In turn, the spraying actions are molded as curvilinear paths which sweep the relevant portions of the tool geometry into volumes for interference testing. At this level, assessing the interference is not constrained to be intersections between solids, but also intersections between surfaces and surfaces, or surfaces and solids.

Features are the most complex level of abstraction for this system. The spray planning system, for example, needs to extract convex corner features from the geometric descriptions in order to aim properly the spray to avoid overspray.

Geometric modeling can be performed at various levels, such as wire-frame, surface, or solid modeling. The previous examples suggest that all levels are required in the system. Although solid modeling approaches have the richest information, the representation of lower level elements such as lines and surfaces is not explicit. Furthermore, operations provided within solid modeling approaches do not apply when nonsolid elements are used. The ideal geometric modeling system should uniformly represent and operate on nonhomogeneous (i.e., mixed dimensions) elements such as vertices, lines, surfaces, and solids. NOODLES offers an environment where nonhomogeneous elements are uniformly represented and permits Boolean operations between elements of any dimensionality.

Figure 10:
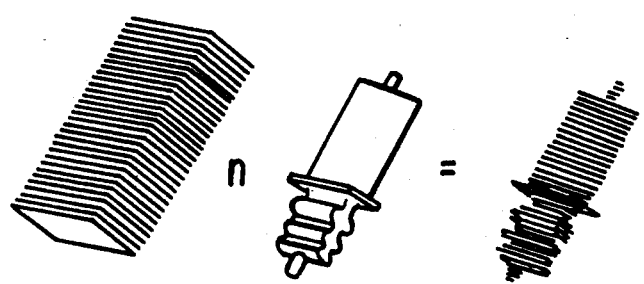
FIG. 10 is a schematic representation of slicing a part with NOODLES.

One example which uses nonhomogeneous representations is the planning of the layered shape deposition processes. The first step is to obtain the cross sections of the object. These sections are obtained from the Boolean intersection between the object and a stack of planar faces that are appropriately spaced. FIG. 10 shows that the result of this nonregular operation is a collection of cross sections. Identification of the interior and skin-fill areas for SLA applications can also be achieved with set operations. The intersection between the projections of contiguous cross sections identifies the interior area; the differences between these cross sections produce the skin-fill areas (FIG. 11). Finally, the vectors to be scanned by the laser are obtained by intersecting appropriate grids with the portions of the cross section. For example, as shown in FIG. 12, the interior area of a cross section is intersected with a ross hatch grid. The object boundaries for the laser are quickly found from the perimeters of the cross sections. Similarly, the grids for robotic path planning are defined by the perimeters of the intersection of the surface boundary of the object with two perpendicular sets of stacks of planar faces.

A feature extraction algorithm is also being developed which automatically recognizes form features of objects represented in NOODLES (Pinilla, J. M., Finger, S. and Prinz, F. B., Shape feature description and recognition using an augmented topology graph grammar, in *Engineering design research conference*, NSF, Amherst, Mass., June, 1989). This algorithm uses a graph grammar to describe and recognize shape features, based on an augmented topology of the modeled objects which contain these features. The NOODLES representation provides the information for construction for the augmented topology graphs. These graphs constitute the search space for the recognition of the subgraphs which correspond to the features. In injection molding, features like ribs and bosses are recognized in this manner (20). Once a feature is recognized by mapping the descriptive subgraph into the object graph, various regimes in the subgraph are also identified with their counterparts in the surface model. The relevant attributes for a feature can thus be evaluated by referring to the actual representation. For instance, the draft angle attributes of the rib features in an injection molded part is very relevant for assessing ejectability. When a rib is recognized by identifying certain surfaces on the object with the opposing sides of the rib, the draft angle can be computed using the geometric information in the model.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. A method for rapid tool manufacturing comprising the steps of:
   building an SFF pattern made of plastic to be used to make a first die half;
   spraying metal onto the pattern without any solid layer between the pattern and the metal to form a first metal substrate;
   separating the substrate from the SFF pattern to form the first die half;
   building a second SFF pattern to be used to make a second die half;
   spraying metal onto the second SFF pattern to form a second metal substrate; and
   separating the second metal substrate from the second SFF pattern to form the second die half.

2. A method for rapid tool manufacturing comprising the steps of:
   building an SFF pattern made of plastic to be used to make a first die half;
   spraying metal onto the pattern without any solid layer between the pattern and the metal to form a first metal substrate;
   separating the substrate from the SFF pattern to form the first die half;
   building an SFF model of a part to be molded;
   inserting the model into the first die half;
   spraying metal onto the model in the first die half to form a second metal substrate; and
   separating the second metal substrate from the model and the first die half to form the second die half.

3. A method as described in claim 2 including after the step of spraying metal onto the pattern the step of pouring backing material onto the first metal substrate to support it.

4. A method as described in claim 3 including before the step of spraying metal on the pattern, the step of applying a water soluble release agent on the pattern.

5. A method as described in claim 4 wherein the step of separating the substrate from the pattern includes the step of dissolving the water-soluble release agent.

6. A method as described in claim 5 including after the step of building the SFF pattern, the step of placing a metal frame onto the pattern; and wherein the step of spraying metal on the pattern includes the step of spraying metal around the inside edge of the metal frame.

7. A method as described in claim 6 including before the pouring step the step of laying in place on the first metal substrate tubing for channels.

8. A method as described in claim 7 including after the inserting step, the step of applying a water-soluble release agent on the model, and placing a second metal frame on the first die half; and after the step of spraying metal onto the model and around the inside edge of the frame; the steps of laying in place on the model tubing for cooling channels; pouring backing material on the model to support the second metal substrate; and dissolving the water-soluble release agent between the second metal substrate and the model.

9. A method as described in claim 8 wherein the building step includes the step of building an SLA pattern.

10. A method as described in claim 1 wherein the spraying step includes the step of spraying metal onto the pattern in multiple layers without any solid layer between the pattern and the metal.

11. A method as described in claim 10 wherein the step of building any SFF pattern made of plastic includes the step of building an SFF pattern made of plastic from a computer-based geometric model.

12. A method as described in claim 11 wherein the spraying step includes the step of robotically spraying metal onto the pattern in correspondence with the computer-based geometric model.

13. A method as described in claim 12 wherein before the building step, there is the step of creating the computer-based model on a CAD/CAM system.

14. A method as described in claim 13 wherein the spraying step includes the step of spraying zinc.

15. A method as described in claim 2 wherein the spraying step includes the step of spraying metal onto the pattern in multiple layers without any solid layer between the pattern and the metal.

16. A method as described in claim 15 wherein the step of building an SFF pattern made of plastic includes the step of building an SFF pattern made of plastic from a computer-based geometric model.

17. A method as described in claim 16 wherein the spraying step includes the step of robotically spraying metal onto the pattern.

18. A method as described in claim 17 wherein before the building step, there is the step of creating the computer-based model on a CAD/CAM system.

19. A method as described in claim 18 wherein the spraying step includes the step of spraying zinc.

20. A method for rapid tool manufacturing comprising the steps of:
building an SFF pattern made of plastic to be used to make a die half;
spraying metal onto the pattern without any solid layer between the pattern and the metal to form a metal substrate;
separating the substrate from the SFF pattern to form the die half.

21. A method as described in claim 20 wherein the spraying step includes the step of spraying metal onto the pattern in multiple layers without any solid layer between the pattern and the metal.

22. A method as described in claim 21 wherein the step of building an SFF pattern made of plastic includes the step of building an SFF pattern made of plastic from a computer-based geometric model.

23. A method as described in claim 22 wherein the spraying step includes the step of robotically spraying metal onto the pattern.

24. A method as described in claim 23 wherein before the building step, there is the step of creating the computer-base model on a CAD/CAM system.

25. A method as described in claim 24 wherein the spraying step includes the step of spraying zinc.

26. A method for rapid tool manufacturing comprising the steps of:
building an SFF pattern from a computer-based geometric model; and
robotically spraying metal onto the SFF pattern in correspondence with the computer based geometric model.

27. A method as described in claim 26 wherein before the building step, there is the step of creating the computer-based geometric model on a CAD/CAM system.

* * * * *

UNITED STATES PATENT AND TRADEMARK OFFICE
CERTIFICATE OF CORRECTION

PATENT NO. : 5,189,781
DATED : March 2, 1993
INVENTOR(S) : Lee E. Weiss, Friedrich B. Prinz, E. L. Gursoz It is certified that error appears in the above-identified patent and that said Letters Patent is hereby corrected as shown below:

In the drawing sheets, add sheet 8 of 8 which has figure 11 and figure 12,

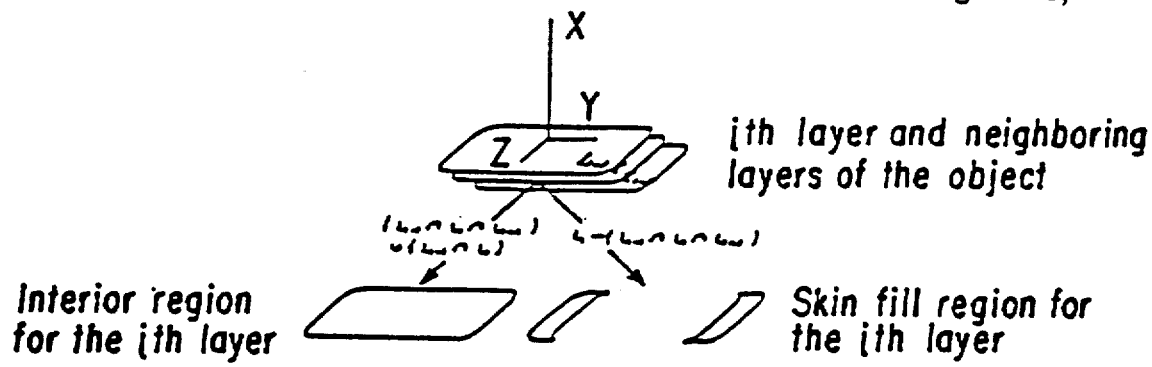

FIG. 11

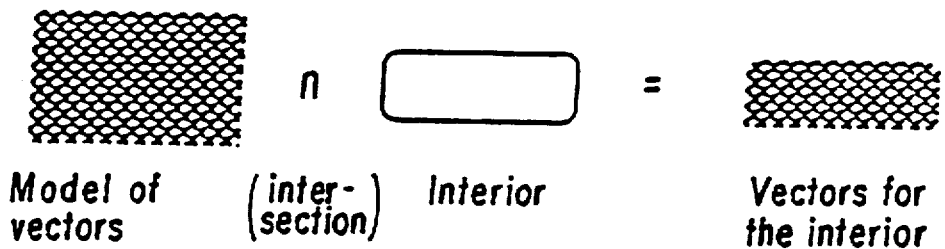

FIG. 12

UNITED STATES PATENT AND TRADEMARK OFFICE
CERTIFICATE OF CORRECTION

PATENT NO. : 5,189,781

DATED : March 2, 1993

INVENTOR(S) : Lee E. Weiss, Friedrich B. Prinz, E. L. Gursoz

It is certified that error appears in the above-identified patent and that said Letters Patent is hereby corrected as shown below:

Title page, second column, last line, change "7 drawing sheets" to -- 8 drawing sheets --.

Page 1, change "sheet 1 of 7" to -- sheet 1 of 8 --.

Page 2, change "sheet 2 of 7" to -- sheet 2 of 8 --;

Page 2, change "sheet 3 of 7" to -- sheet 3 of 8 --;

Page 2, change "sheet 4 of 7" to -- sheet 4 of 8 --;

Page 2, change "sheet 5 of 7" to -- sheet 5 of 8 --;

Page 2, change "sheet 6 of 7" to -- sheet 6 of 8 --;

Page 2, change "sheet 7 of 7" to -- sheet 7 of 8 --;

Signed and Sealed this

Seventeenth Day of May, 1994

*Attest:*

BRUCE LEHMAN

*Attesting Officer*     *Commissioner of Patents and Trademarks*